United States Patent [19]

Mayfield

[11] 4,372,853
[45] Feb. 8, 1983

[54] REMOVABLE, HERMETICALLY-SEALING, FILTER ATTACHMENT SYSTEM FOR HOSTILE ENVIRONMENTS

[75] Inventor: Glenn L. Mayfield, Richland, Wash.

[73] Assignee: The United States of America as represented by the Department of Energy, Washington, D.C.

[21] Appl. No.: 269,459

[22] Filed: Jun. 3, 1981

[51] Int. Cl.³ ............................................ B01D 35/02
[52] U.S. Cl. .................................... 210/232; 55/505; 210/450
[58] Field of Search ............... 210/232, 236, 495, 450, 210/476; 55/505

[56] References Cited

U.S. PATENT DOCUMENTS 3,002,870 10/1961 Belgarde et al. ............... 210/232 X
3,760,568 9/1973 Neumann .......................... 55/505 X Primary Examiner—Frank A. Spear, Jr.
Attorney, Agent, or Firm—Douglas E. Erickson; Richard E. Constant; Richard G. Besha

[57] ABSTRACT

A removable and reusable filter attachment system. A filter medium is fixed to, and surrounded by, a filter frame having a coaxial, longitudinally extending, annular rim. The rim engages an annular groove which surrounds the opening of a filter housing. The annular groove contains a fusible material and a heating mechanism for melting the fusible material. Upon resolidifying, the fusible material forms a hermetic bond with the rim and groove. Remelting allows detachment and replacement of the filter frame.

15 Claims, 3 Drawing Figures

REMOVABLE, HERMETICALLY-SEALING, FILTER ATTACHMENT SYSTEM FOR HOSTILE ENVIRONMENTS

BACKGROUND OF THE INVENTION

The present invention relates generally to filter attachment systems and more particularly to a removable and reusable filter attachment system which is hermetically sealing and environmentally resistant. The U.S. Government has rights in this invention pursuant to Contract No. DE-AC06-77RL01030 between the U.S. Department of Energy and the Rockwell International Corporation.

Filters are employed in fluid streams to remove unwanted substances from the fluid flow. In some applications, such as in the nuclear industry, it is important that the filters be attached to the fluid channeling ducts such that there is no flow leakage around the filter, and, such that this fluidtight bond is maintained even in a radioactive, corrosive, thermally hot, or otherwise hostile environment.

Existing filter attachment systems, used for hermetic sealing, join the filter frame containing filter material to the filter housing on the channeling duct generally by using a glue-like compressible material, such as an elastomer or rubber compound, on the surfaces to be joined. These surfaces are then held together under highly compressive forces, such as those generated by use of clamps or flange bolts, until the sealant cures to bond together the surfaces. For filter replacement, the filter frame must be separated from the filter housing by a pulling apart, to overcome the bonding, such as by use of pry bars. A solvent would then generally be used to remove any sealant adhering to the filter housing on the channeling duct prior to installing a new filter.

Present filter attachment systems have difficulties in forming a hermetic seal, in replacing the filter, and in deployment in a hostile environment. Filter frames and filter housings normally do not have sufficient stiffness to achieve the well matched surfaces necessary for a fluidtight bond. When surfaces mismatch because close tolerances have not been met, the sealant loses its resilience or degrades and a leak path occurs. As a separate problem, the highly compressive forces necessary to hold the surfaces together during the setting of the sealant may distort the insufficiently stiff surfaces to produce additional breaks in the hermetic seal. Further distortion of the surface of the filter housing may occur when the filter frame is pried loose during filter replacement. Existing systems have difficulties in extreme environments where high temperature, radioactive, and/or corrosive fluid may weaken or degrade sealants such as elastomers and rubbers, and where lengthy and close contact by personnel in system installation and removal may increase health or safety risks.

SUMMARY OF THE INVENTION

It is an object of the invention to provide a hermetically sealing filter attachment system.

It is an added object of the invention to provide a filter attachment system which maintains its fluidtight seal in hostile environments, such as those containing thermally hot, radioactive, and/or corrosive fluids.

It is also an object of the invention to provide a reusable filter attachment system that permits quick and easy filter installation and removal.

It is a further object of the invention to provide a filter attachment system without using highly compressive forces on the flexible mating surfaces, thereby eliminating a complex filter holding mechanism.

It is another object of the invention to provide a filter attachment system wthout the need for close tolerances on the mating surfaces.

Additional objects, advantages, and novel features of the invention will be set forth in part in the description which follows, and in part will become apparent to those skilled in the art upon examination of the following or may be learned by practice of the invention.

The objects and advantages of the invention may be realized and attained by means of the instrumentalities and combinations particularly pointed out in the appended claims.

To achieve the foregoing and other objects and in accordance with the purpose of the present invention, as embodied and broadly described herein, the removable filter attachment system may comprise a filter medium, an annular filter frame, a reusable filter housing, an environmentally resistant fusible material, and an attached heating mechanism. The filter frame encircles, and is secured to, the filter medium. The filter housing has an opening approximately matching the end of the filter medium. The filter frame is engageable with the filter housing by a rim and matching groove arrangement. The frame has a coaxially orientated, annular rim encircling the filter medium's end, and the housing has a coaxially orientated, annular groove encircling the filter housing's opening, or the frame has the groove and the housing has the rim. The fusible material, located in the groove, has a melting point which is lower than the melting point of either the rim or the groove. Upon melting and resolidifying, the fusible material will form a fluidtight bond with both the rim and the groove. The attached heating mechanism can melt the fusible material without melting either the rim or the groove.

Preferably, when the filter frame has the rim, the rim projects longitudinally beyond the end of the filtering medium. The attached heating means preferably is located in the groove of the filter housing. In a preferred orientation, the filter housing has its groove lying in an approximately horizontal plane facing upwards. Preferably, the fusible material includes a metal, such as Lipowitz' alloy.

In an alternate embodiment of the invention, the heating mechanism is attached to the rim of the filter frame and the fusible material has a viscous melt condition which sticks to the groove. Preferred orientations of the filter housing include having the groove lying in an approximately vertical plane or lying in an approximately horizontal plane facing downwards. For this embodiment of the invention, a preferred fusible material would be ethyl cellulose plastic.

Another embodiment of the invention would interchange the rim and the groove so that the filter frame would be formed to include a groove and the filter housing would be formed to include a rim. The heating mechanism would be attached to either the filter housing rim or the filter frame groove.

Several benefits and advantages are derived from the invention. A reusable filter attachment system is provided which has hermetic sealing of the filter frame to the filter housing, with easy filter replacement, but without the need for close tolerance, highly compressive forces, or loss of fluidtight condition in hostile environments, such as those containing radioactive fluids.

BRIEF DESCRIPTION OF THE DRAWINGS

The accompanying drawings which are incorporated in and form a part of this specification, illustrate several embodiments of the present invention and, together with a description, serve to explain the principles of the invention. In the drawings.

DETAILED DESCRIPTION OF THE INVENTION

Reference will now be made in detail to several present preferred embodiments of the invention, examples of which are illustrated in the accompanying drawings.

Figure 1:
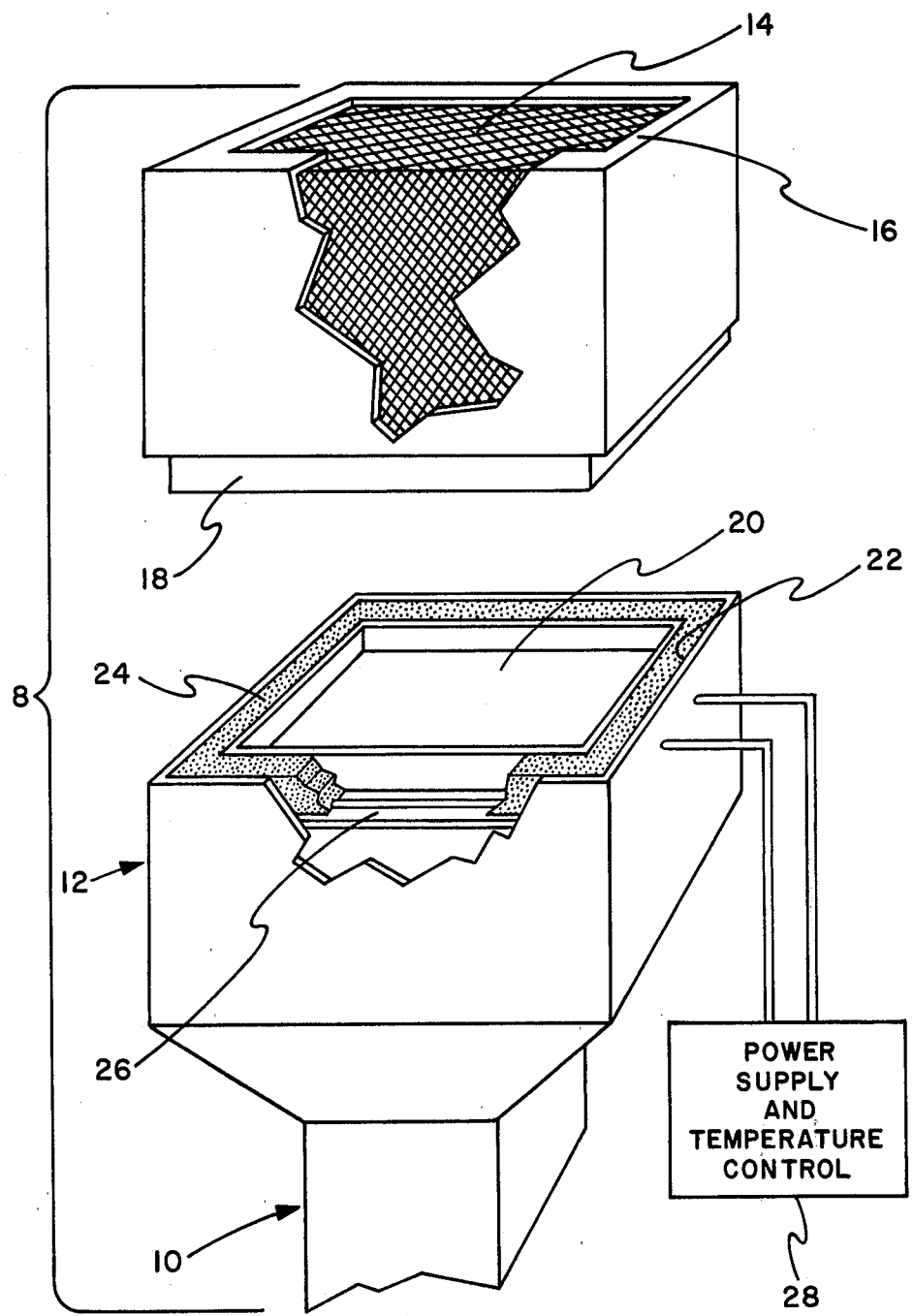
FIG. 1 is a partial cutaway, perspective, assembly view of the removable filter attachment system.
Figure 2:
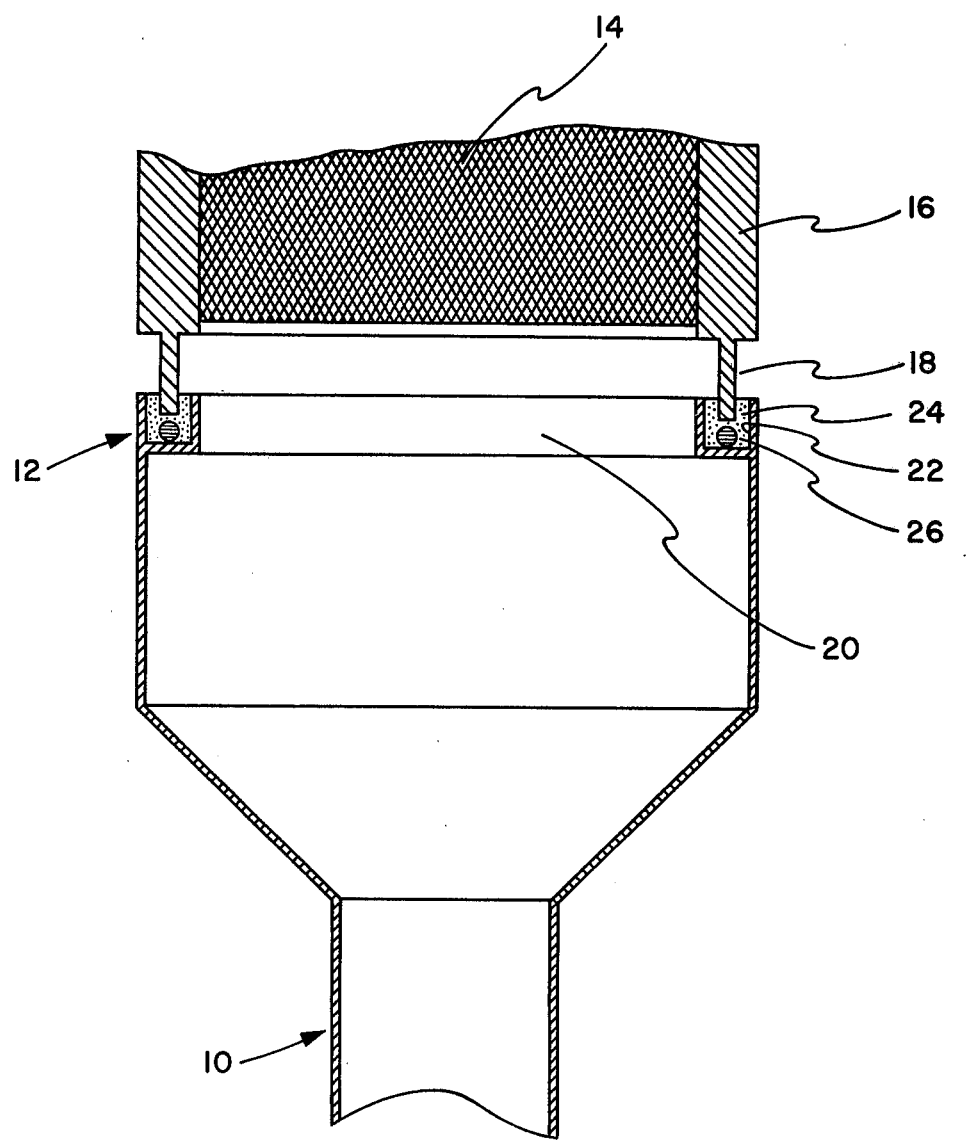
FIG. 2 is an elevational, sectional view of FIG. 1 with the filter frame attached to the filter housing.

A first embodiment 8 of the invention, as shown in FIGS. 1 and 2, has a channeling duct 10 which would contain a fluid (gas and/or liquid) stream containing materials desired to be filtered from the fluid flow. The fluid stream may be radioactive, corrosive, and/or thermally hot. The channeling duct 10 terminates in a filter housing 12. A filter medium 14, which requires periodic replacement, could include any kind of filtering mechanism such as the cells of an electrostatic precipitator or a more conventional fibrous filter. The filter medium 14 is enclosed in, and attached to, a surrounding annular filter frame 16. The filter frame 16 has a first longitudinal axis and has a coaxial, annular rim 18 which surrounds the filter medium's end and extends in a longitudinal direction. The longitudinally extending annular rim 18 may originate from the top or bottom of the filter frame 16, or from any longitudinal distance inbetween. Preferably, the rim 18 extends longitudinally beyond the end of the filter medium 14. The filter housing 12 is reusable and supports the filter frame 16 for attachment. The filter housing 12 has an opening 20 which approximates the shape of the end of the filter medium 14. The filter housing 12 also has a second longitudinal axis and a coaxial, annular groove 22 which surrounds the opening 20. The rim 18 of the filter frame 16 can be engaged in the groove 22 of the filter housing 12. The fit can be quite loose as there is no need for close tolerances. A fusible material 24 is located in the groove 22. The fusible material must have a melting point which is lower than the melting point of the rim 18 of the filter frame 16 and which is lower than the melting point of the groove 22 of the filter housing 12. Of course, the fusible material 24 must have a melting point which is higher than the temperature of the fluid stream passing through the channeling duct 10. The fusible material 24 will form a fluidtight bond upon melting and resolidifying, with both the rim 18 of the filter frame 16 and with the groove 22 of the filter housing 12. A heating means 26, having a power supply and temperature control 28, supplies controlled heat to melt the fusible material but without reaching the melting point of the rim 18 or of the groove 22. The heating means 26 is attached to the filter housing 12. Preferably, the heating means 26 is disposed in the groove 22 of the filter housing 12. Also, it is preferred that the heating means 26 include an electrically resistive heating cable, capable of supporting the weight of the filter frame 16 and filtering medium 14, which is disposed along the entire groove 22. In this embodiment of the invention, it is preferred that the filter housing 12 be orientated such that the groove 22 lies in a generally horizontal plane facing upwards. In this orientation, the heating means 26 could even be attached to the filter housing 12 by only the bonding effect of the fusible material 24, when it is solidified in the groove 22. To survive in hostile environments, it is preferred that the fusible material 24 contain a metal, such as a fusible alloy, and a preferred material 24 would be Lipowitz' alloy (50% Bi, 27% Pb, 13% 5n, and 10% Cd). Wood's metal could also be used. Such a fusible material 24 would be able to hold up in radioactive, corrosive, and/or thermally hot environments.

Figure 3:
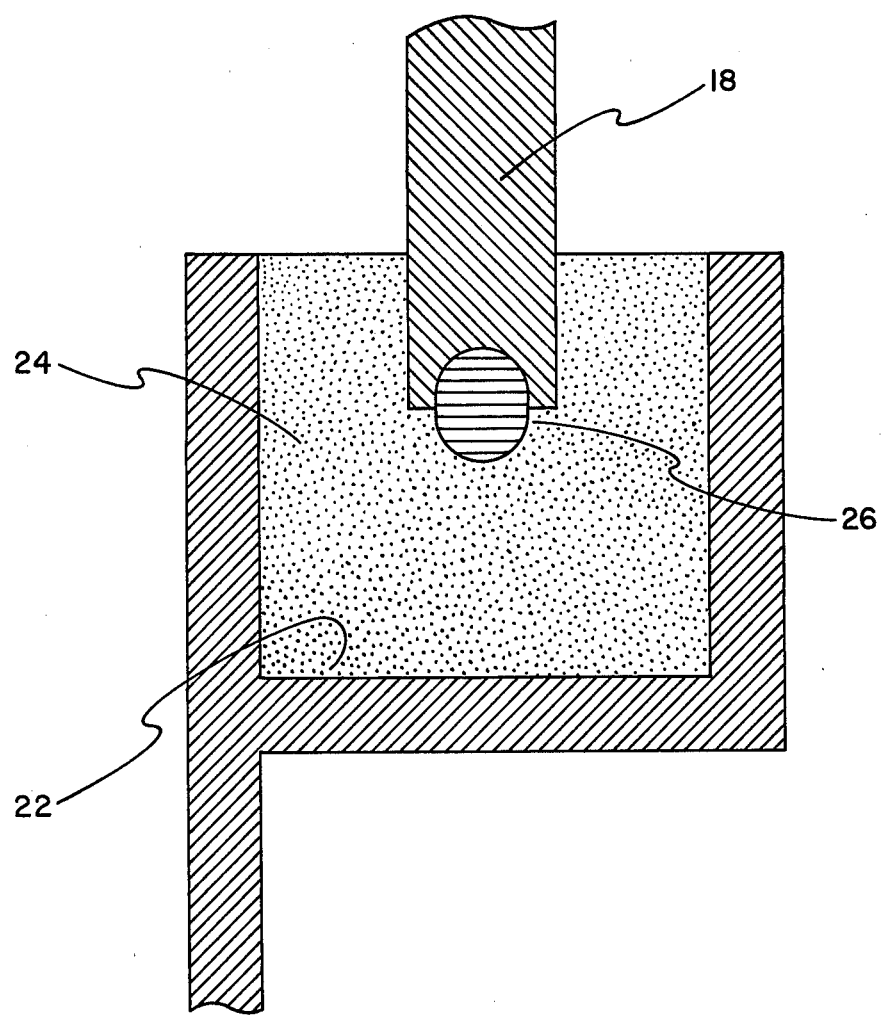
FIG. 3 is a rim and groove portion only of FIG. 2 but with the option of having the heating mechanism attached to the rim instead of the groove.

A second embodiment of the invention would be depicted as in FIG. 2 with the exception that the heating means 26 would be attached to the filter frame 16 instead of being attached to the filter housing 12. In this embodiment, it is preferred that the rim 18 project longitudinally beyond the end of the filter medium 14 and that the heating means 26 be attached to this rim 18. This is shown in FIG. 3. The preferred orientation of this embodiment would have the filter housing 12 with its groove 22 lying in a generally vertical plane, or with its groove 22 lying in a generally horizontal plane facing downwards. In either of these two orientations, it is necessary that the fusible material 24 adhere to the groove 22 not only in its solid state, but also in its melted state. This requires that the fusible material 24 have a viscous consistency in its melt condition. A material having a broad melting point would satisfy this condition. A preferred fusible material 24 would be a thermoplastic material such as ethyl cellulose plastic. It should be noted that the fusible material 24 is chosen to maintain a hermetic seal with the filter housing 12 and the filter frame 16 in its expected environment. Thus, even fusible materials such as rubbers and elastomers would be environmentally resistant in areas of modest temperature which are devoid of corrosive and radioactive fluids.

A third embodiment of the invention interchanges the rim 18 and groove 22 of the first embodiment of the invention discussed previously. In this third embodiment, it is the filter frame which has a coaxial, longitudinally disposed, annular groove, while the filter housing has an annular rim which surrounds the opening. The heating means is attached to the filter housing, preferably to the rim.

In a fourth embodiment of the invention, the removable filter attachment system is the same as that of the third embodiment discussed previously, with the exception that the heating means is attached to the filter frame, preferably disposed in the groove, instead of being attached to the filter housing.

For all four of the embodiments of the invention discussed above, the operation of the removable filter attachment system begins with the filter frame 16 being separated from the filter housing 12. Fusible material 24 must be initially placed in the groove 22. If the groove 22 is generally horizontal facing upwards, the fusible material 24 could be supplied in solid form. For other orientations, it might be better to supply the fusible material 24 in melt form making sure that the fusible material 24 is chosen to have a viscous consistency in its melt condition so that it will adhere to the groove 22 overcoming the effects of gravity. With the fusible material 24 placed in the groove 22, the filter frame 16 is brought in contact with the filter housing 12 such that the rim 18 contacts the fusible material 24. The heating means 26 would bring the fusible material 24 to a melt condition and the rim 18 would be made to engage the groove 22 by pressing them together using gravity, machine, or manual means. Only light pressure rather than large clamping forces need be supplied. This engagement may be quite a loose one for close tolerances are not needed. When the rim 18 and groove 22 are engaged, the heating means 26 is shut off to allow the melted fusible material 24 to resolidify by cooling. The cooling could be aided by a separate cooling mechanism if desired. Upon resolidification of the fusible material 24, the filter frame 16 will be hermetically sealed to the filter housing 12. To replace the filter, the heating means 26 would be activated to melt the fusible material 24, and the filter frame 16, containing the filter medium 14, would be pulled apart from the filter housing 12 by gravity, machine, or manual means. If needed, additional fusible material 24 would be supplied to the groove 22 as was done initially. The replacement filter frame containing the replacement filter medium would then be installed as was done in the initial installation.

In summary, by using a filter frame 16 and a filter housing 12 having a rim 18 and groove 22 engagement wherein the groove 22 contains a fusible material 24 heated to its melting point by an attached heating means 26, a filter frame 16 will be hermetically bonded to a filter housing 12 in a removable filter attachment system.

The foregoing description of a preferred embodiment of the invention has been presented for purposes of illustration and description. It is not intended to be exhaustive or to limit the invention in the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:
1. A removable filter attachment system, comprising:
(a) a filter medium having an end;
(b) an annular filter frame fixed to, and surrounding said filter medium, said filter frame having a first longitudinal axis and having a coaxially disposed, annular, first member surrounding said end;
(c) a reusable filter housing having an opening generally matching said end of said filter medium, having a second longitudinal axis, and having a coaxially disposed, annular, second member surrounding said opening, said first and second members together consisting of a rim and a matching, engageable groove;
(d) an environmentally resistant fusible material disposed in said groove, said fusible material having a melting point lower than that of said rim and lower than that of said groove, and said fusible material hermetically bondable, upon melting and resolidifying, with said rim and with said groove; and
(e) attached means operably associated with said rim and groove for electrically resistive heating said fusible material to its melting point without reaching the melting point of said rim and without reaching the melting point of said groove.

2. The system of claim 1, wherein said first member consists of said rim and said second member consists of said groove.

3. The system of claim 2, wherein said rim extends longitudinally beyond said end of said filter medium.

4. The system of claim 3, wherein said heating means is disposed in said groove of said filter housing.

5. The system of claim 4, wherein said filter housing is disposed to have said groove lie in a generally horizontal plane facing upwards.

6. The system of claim 5, wherein said fusible material includes a metal.

7. The system of claim 6, wherein said fusible material consists of Lipowitz' alloy.

8. The system of claim 3, wherein said heating means is attached to said rim of said filter frame.

9. The system of claim 8, wherein said material, when melted, has a viscous consistency and adheres to said groove.

10. The system of claim 9, wherein said filter housing is disposed to have said groove lie in a generally vertical plane.

11. The system of claim 9, wherein said filter housing is disposed to have said groove lie in a generally horizontal plane facing downwards.

12. The system of claims 10 or 11, wherein said material includes ethyl cellulose plastic.

13. The system of claim 1, wherein said first member consists of said groove and said second member consists of said rim.

14. The system of claim 13, wherein said heating means is attached to said rim of said filter housing.

15. The system of claim 13, wherein said heating means is disposed in said groove of said filter frame.

* * * * *